US009191433B2

(12) United States Patent
Klassen et al.

(10) Patent No.: US 9,191,433 B2
(45) **Date of Patent: *Nov. 17, 2015**

(54) CAPTURING AND PROCESSING MULTI-MEDIA INFORMATION USING MOBILE COMMUNICATION DEVICES

(71) Applicant: BLACKBERRY LIMITED, Waterloo (CA)

(72) Inventors: Gerhard Dietrich Klassen, Waterloo (CA); Terrill Mark Dent, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,492

(22) Filed: Aug. 14, 2014

(65) Prior Publication Data

US 2014/0357242 A1 Dec. 4, 2014

Related U.S. Application Data

(63) Continuation of application No. 13/270,090, filed on Oct. 10, 2011, now Pat. No. 8,818,339.

(51) Int. Cl.
*H04M 3/42* (2006.01)
*H04L 29/08* (2006.01)
*H04M 1/725* (2006.01)

(52) U.S. Cl.
CPC ................ *H04L 67/06* (2013.01); *H04L 67/22* (2013.01); *H04M 1/72522* (2013.01); *H04M 1/72558* (2013.01)

(58) Field of Classification Search
CPC .... H04W 15/00; G06Q 30/0261; H04L 63/10
USPC ............... 455/556.1, 566, 456.3, 414.3, 63.1, 455/411, 88, 425, 414.1; 726/1, 27, 4, 24; 340/870.02
See application file for complete search history.

(56) References Cited

U.S. PATENT DOCUMENTS 7,177,872 B2 * 2/2007 Schwesig et al.
2003/0120680 A1 6/2003 Agrawal et al.

(Continued)

OTHER PUBLICATIONS

Examination Report mailed Apr. 29, 2013; in corresponding European patent application No. 11184550.9.

(Continued)

*Primary Examiner* — Kiet Doan
(74) *Attorney, Agent, or Firm* — Fish & Richardson P.C.

(57) ABSTRACT

Methods and devices are provided for generating and publishing multi-media information associated with actions performed on a mobile communication device. A publishing application monitors actions performed on the mobile communication device and enables selection of at least one of the actions. Content associated with selected actions may be stored and data associated with at least one of the selected actions and the content associated with at least one selected action may be extracted. The multi-media information may be displayed on a graphical user interface in a pre-selected format, such as a chronologically arranged list. Users may preview and modify the multi-media information before publication through a pre-selected communication service. The multi-media information may be published by selecting an icon, including an image identifying the pre-selected communication service. The mobile communication device generates content that users may efficiently modify and publish to a desired communication service.

20 Claims, 5 Drawing Sheets

(56) References Cited

U.S. PATENT DOCUMENTS

| | | | | |
|---|---|---|---|---|
| 2004/0137921 | A1 | 7/2004 | Valloppillil et al. | |
| 2005/0050453 | A1 | 3/2005 | Barnabei | |
| 2006/0107327 | A1* | 5/2006 | Sprigg et al. | 726/26 |
| 2008/0147493 | A1 | 6/2008 | Aarnio et al. | |
| 2009/0043783 | A1 | 2/2009 | Wakasa et al. | |
| 2010/0062750 | A1* | 3/2010 | Nurminen et al. | 455/414.2 |
| 2011/0053513 | A1* | 3/2011 | Papakostas et al. | 455/63.1 |
| 2011/0061016 | A1* | 3/2011 | Song et al. | 715/779 |
| 2011/0225417 | A1 | 9/2011 | Maharajh et al. | |
| 2011/0288917 | A1 | 11/2011 | Wanek et al. | |

OTHER PUBLICATIONS

Get Mobile, Aug. 6, 2010; http://learn.wordpress.com/get-mobile/.

Marina Del Rey , Personal Brian 6 Provides One Click Publishing and Powerful New Synchronization to Share “Digital Thinking”, Across Multiple Platforms, Oct. 5, 2010, http://www.prweb.com/releases/2010/101prweb4609464.html.

Tracy Grover, Launch of Customized Social page Oct. 31, 2010, http://fanminder.com/category/product.

Media vault, Sep. 21, 2009, Techguys, http://www.thetechguys.com/services/media-vault/.

Extended European Search report mailed Feb. 10, 2012; in corresponding European patent application No. 11184550.9.

Alex Egg; Customize share picture via menu on android (Android Intent Filters), Jun. 14, 2011, pp. 1-7, Retrieved from the Internet: URL: http://eggie5.com/8-hook-share-picture-via-menue-android, retrieved on Jan. 2, 2012.

Office Action mailed Sep. 11, 2014; in Canadian patent application No. 2,790,485.

* cited by examiner

CAPTURING AND PROCESSING MULTI-MEDIA INFORMATION USING MOBILE COMMUNICATION DEVICES

CROSS-REFERENCE TO RELATED APPLICATIONS

The present application is a continuation of U.S. application Ser. No. 13/270,090, filed on Oct. 10, 2011, now issued as U.S. Pat. No. 8,818,339, the application is expressly incorporated by reference herein.

FIELD OF THE DISCLOSURE

The disclosure relates generally to mobile communication devices, and more particularly, to capturing and processing multi-media information using mobile communication devices.

BACKGROUND

Conventional communication devices allow users to capture and share content. Sharing the content via the communication devices generally involves performing a plurality of steps, including evaluating the content, selecting a service that enables content sharing, selecting an audience to share the content, formatting the content for the selected sharing service, annotating the content and uploading the content through a selected exchange medium. Performing these multiple steps on mobile communication devices to share content is often challenging, especially while multitasking. What is needed is a mobile communication device that facilitates processing of multi-media information.

DETAILED DESCRIPTION

Figure 1:
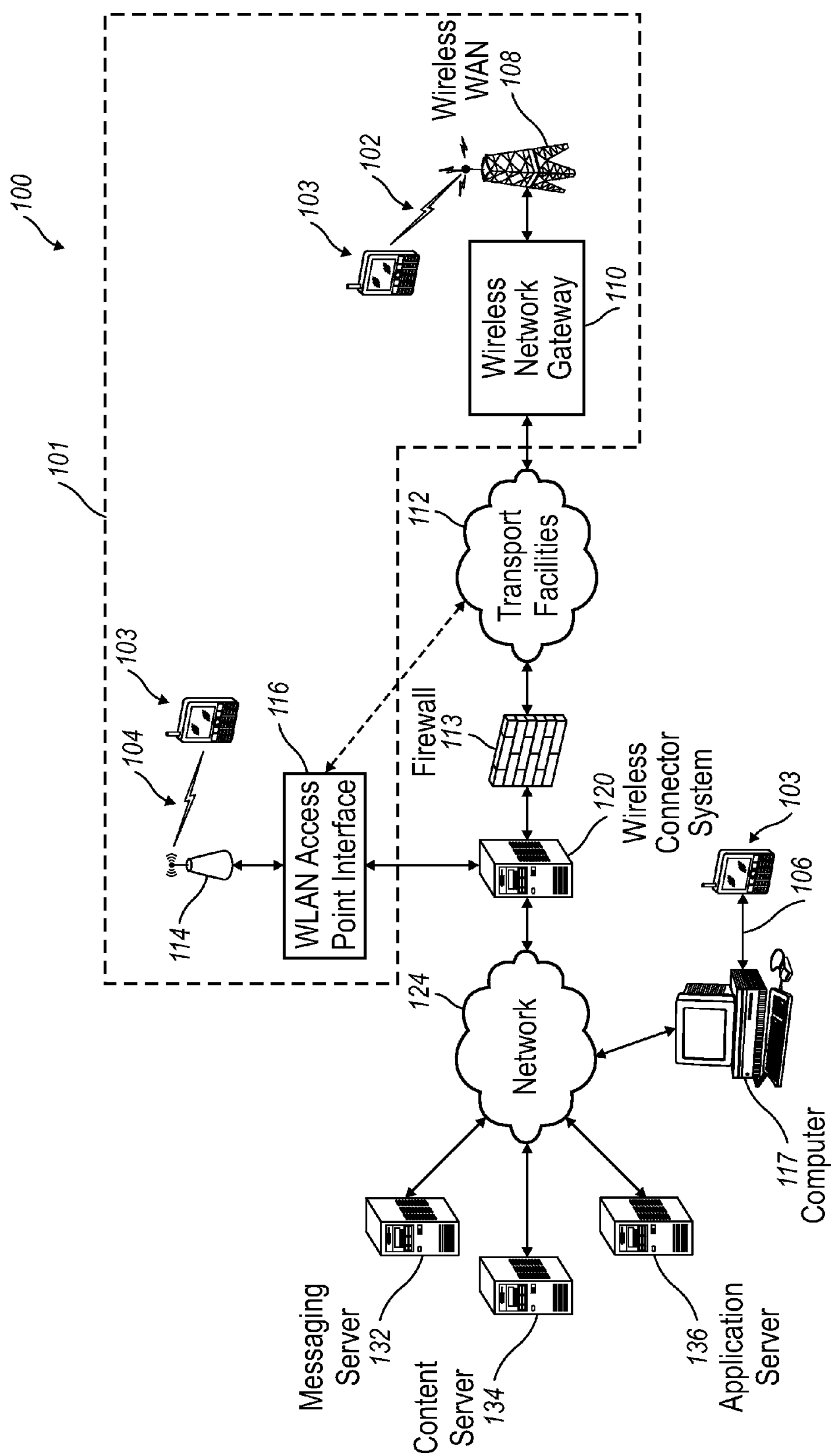
FIG. 1 is a communication system for mobile communication devices according to one example.

The disclosure provides a software application that records all types of actions performed on the mobile communication devices. The actions may be associated with gathering and manipulating content, including digital images, music files, video images, voice note files, media files, email messages, text messages, telephone communication data, voice mail files, telephone call logs, mobile applications, web sites, contact entries, and calendar entries, or the like. The mobile applications may include TV applications, finance applications, weather applications, memo pad applications, task applications, game applications, map applications, and email applications, or the like.

According to one example, the actions performed on the mobile communication device include user-performed actions and device-performed actions. The user-performed actions may include actions performed while users interact directly or indirectly with the mobile communication device. For example, users may directly perform actions on the mobile communication device through a graphical user interface (GUI), a navigation tool, a keyboard and a voice-command receiving device, or the like. Users may indirectly perform actions on the mobile communication device by, for example, programming remote devices to push data to the mobile communication device, among performing other indirect actions. The user-performed actions may be recorded by detecting and storing data associated with user actions performed on the mobile communication device. The user-performed actions may include manipulating the navigation tool, the keyboard and the GUI to select an application, install an application, launch the application, capture content through the application and initiate communications to share the captured content with third parties, among performing other user-performed actions. Initiating communications to share the captured content may include coupling devices through proprietary connections, such as a BLACKBERRY® bridge or the like.

The device-performed actions may include actions performed directly or indirectly by the mobile communication device running software applications. For example, the mobile communication device may directly perform actions such as embedding data into captured content, including user-captured content and device-captured content. The embedded data may include location data, including global positioning satellite (GPS) data, geographic information system (GIS) data, and cellular tower location data, or the like. The embedded data may include other data, including time of capture data, weather data, content description data, and application-type data, or the like. The mobile communication device may indirectly perform actions, such as populating an icon with an indicator, such as a logo that identifies the preselected sharing communication service.

A publishing application, for example, may generate content describing the user-performed actions and the device-performed actions in a format for publishing with communication services, such as social networking services and micro-blogging services, among other communication services. According to one embodiment of the disclosure, textual content may be generated describing the user-performed actions and the device-performed actions occurring on the mobile communication device. For example, a user may access a music player on the mobile communication device and may select to listen to The X Album by X artist. In this case, a publishing application provided on the mobile communication device may automatically compose textual messages describing the user-performed actions and the device-performed actions.

The publishing application may detect actions performed on the mobile communication device and may generate a graphical representation of the actions for display on the GUI. The graphical representation may include providing a list of actions, among other graphical representations. The graphical representations of the actions may be published over the Internet using pre-selected communication services. According to one example, the pre-selected communication services may be associated with generated or captured content, based on the content type. The pre-selected communication services may be presented to users for selection through icons that are positioned adjacent to the generated or captured content. The icons may include corresponding logos that identify the communication services selected for sharing the generated or captured content that is associated with the user-performed actions and the device-performed actions. For example, icon logos may include a TWITTER™ or a FACEBOOK™ logo. Users may select a desired icon in order to share the associated content by publishing the content through the pre-selected communication services. Alternatively, users may access a menu of alternative communication services to publish the selected content. From the menu of alternative communication services, users may select desired communication services that are configured to publish the captured or generated content. Furthermore, if the mobile communication device does not support or recognize the captured content, the publishing application may direct users to online resources that enable the mobile communication device to process the captured content. For example, the publishing application may direct users to application resources, such as an application store, which allow users to download applications supporting the captured content.

FIG. 1 illustrates an example of an operating environment for a communication system 100 that may include a number of mobile communication devices 103. The communication system 100 may support the mobile communication devices 103 in any of several different ways. The mobile communication devices 103 may be coupled to a wireless network 101, such as one or more of a Wireless Wide Area Network (WWAN) 102 and a Wireless Local Area Network (WLAN) 104, among other suitable network arrangements. In some examples, the mobile communication devices 103 may be configured to communicate over both the WWAN 102 and WLAN 104, and to roam between these networks. In some examples, the wireless network 101 may comprise multiple WWANs 102 and WLANs 104, among other configurations.

The WWAN 102 may be implemented as any suitable wireless access network technology. By way of example, but not limitation, the WWAN 102 may be implemented as a wireless network that includes a number of transceiver base stations 108 (one of which is shown in FIG. 1), where each of the base stations 108 provide wireless Radio Frequency (RF) coverage to a corresponding area or cell. The WWAN 102 typically is operated by a mobile network service provider that provides subscription packages to users of the mobile communication devices 103. In some examples, the WWAN 102 may conform to one or more of the following wireless network types: Mobitex Radio Network; DataTAC; GSM (Global System for Mobile Communication); GPRS (General Packet Radio System); TDMA (Time Division Multiple Access); CDMA (Code Division Multiple Access); CDPD (Cellular Digital Packet Data); iDEN (integrated Digital Enhanced Network); Ev-DO (Evolution-Data Optimized); CDMA2000; EDGE (Enhanced Data rates for GSM Evolution); UMTS (Universal Mobile Telecommunication Systems); HSPDA (High-Speed Downlink Packet Access); IEEE 802.16e (also referred to as Worldwide Interoperability for Microwave Access or “WiMAX”), or various other networks. While WWAN 102 is described herein as a “Wide-Area” network, that term is intended also to incorporate wireless Metropolitan Area Networks (WMAN) or other similar technologies for providing coordinated service wirelessly over an area larger than that covered by typical WLANs.

The WWAN 102 may communicate with a wireless network gateway 110 that couples the mobile communication devices 103 to transport facilities 112. The transport facilities 112 couple the mobile communication devices 103 to a wireless connector system 120. The transport facilities 112 may include one or more private networks or lines, the Internet, a virtual private network, or any other suitable network, among other transport facilities. The wireless connector system 120 may be operated, for example, by an organization or enterprise such as a corporation, university, or governmental department, among other organizations or enterprises, which allow access to a network 124, such as an internal or enterprise network (e.g., an intranet) and its resources. Alternatively, the wireless connector system 120 may be operated by a mobile network provider. In some examples, the network 124 may be realized using the Internet rather than, or in addition to, an internal or enterprise network.

The wireless network gateway 110 provides an interface between the wireless connector system 120 and the WWAN 102. The wireless network gateway 110 facilitates communication between the mobile communication devices 103 and other devices (not shown) that may be connected, directly or indirectly, to the WWAN 102. Accordingly, communications sent via the mobile communication devices 103 are transported via the WWAN 102, the wireless network gateway 110 and the transport facilities 112 to the wireless connector system 120. Communications sent from the wireless connector system 120 are received by the wireless network gateway 110 and transported via the WWAN 102 to the mobile communication devices 103.

According to one example, the WLAN 104 includes a wireless network that conforms to IEEE 802.11x standards (sometimes referred to as Wi-Fi™) such as, for example, the IEEE 802.11a, 802.11b and/or 802.11g standard. One of ordinary skill in the art will readily appreciate that other communication protocols may be used for the WLAN 104, such as, IEEE 802.11n, IEEE 802.16e (also referred to as Worldwide Interoperability for Microwave Access or “WiMAX”), or IEEE 802.20 (also referred to as Mobile Wireless Broadband Access), among other communication protocols. The WLAN 104 includes one or more wireless RF Access Points (AP) 114 (one of which is shown in FIG. 1) that collectively provide a WLAN coverage area.

The WLAN 104 may be a user’s personal network, an enterprise network, or a hotspot offered by an Internet service provider (ISP), a mobile network provider, or a property owner in a public or semi-public area, for example. The access points 114 may be connected to an access point (AP) interface 116 that may connect to the wireless connector system 120 directly or indirectly. A direct connection may be provided when the access point 114 is part of an enterprise WLAN 104 in which the wireless connector system 120 resides. An indirect connection may be provided via the transport facilities 112, as indicated by the dashed signal line in FIG. 1, if the access point 114 is a personal Wi-Fi network or Wi-Fi hotspot. In this case, a mechanism, such as a virtual private network (VPN), may be used for securely connecting to the wireless connector system 120. The AP interface 116 may provide translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communication devices 103. The wireless connector system 120 also provides administrative control and management capabilities over users and mobile communication devices 103 that may connect to the wireless connector system 120.

The wireless connector system 120 allows the mobile communication devices 103 to access the network 124 and connected resources and services such as a messaging server 132, for example, a Microsoft Exchange Server®, IBM Lotus Domino®, or Novell GroupWise™ email server; a content server 134 for providing content, such as Internet content or content from an organization's internal servers; application servers 136 for implementing server-based applications, such as instant messaging (IM) applications to mobile communication devices 103, and intranet file services; among other connected resources and services.

The wireless connector system 120 typically provides a secure exchange of data (e.g., email messages, personal information manager (PIM) data, and IM data) with the mobile communication devices 103. In some examples, communications between the wireless connector system 120 and the mobile communication devices 103 may be encrypted. In some examples, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some examples, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as a messaging server 132 or a content server 134 or an application server 136, or a combination of these. Conversely, the wireless connector system 120 may send data packets received, for example, from the messaging server 132 or the content servers 134 or the application servers 136 or any combination of these, to the wireless network gateway 110 that then transmits the data packets to the destination mobile communication device 103. The AP interfaces 116 of the WLAN 104 provide similar sending functions between the mobile communication device 103, the wireless connector system 120 and network connection point, such as the messaging server 132, the content server 134, the application server 136, or any combination of these.

The network 124 may comprise a private local area network (LAN), metropolitan area network (MAN), wide area network (WAN), the public Internet or combinations thereof. The network 124 may include virtual networks constructed using any of these networks, alone or in combination. Alternatively, the mobile communication device 103 may connect to the wireless connector system 120 using a computer 117, such as a desktop or a notebook computer, via the network 124. A link 106 may be provided between the mobile communication device 103 and the computer 117 for exchanging information between the mobile communication device 103 and a computer 117 connected to the wireless connector system 120. The link 106 may include one or both of a physical interface or a short-range wireless communication interface.

The physical interface may comprise one or a combination of an Ethernet connection, a Universal Serial Bus (USB) connection, a Firewire™ (also known as an IEEE 1394 interface) connection, or other serial data connections, via respective ports or interfaces of the mobile communication device 103 and computer 117. The short-range wireless communication interface may be a personal area network (PAN) interface. A personal area network is a wireless point-to-point connection implemented without physical cables to connect the two end points. The short-range wireless communication interface may include one or a combination of an infrared (IR) connection, such as an Infrared Data Association (IrDA) connection, a short-range radio frequency (RF) connection, such as one specified by IEEE 802.15.1 or the BLUETOOTH special interest group, or IEEE 802.15.3a, also referred to as UltraWideband (UWB), or other PAN connection.

It will be appreciated that the above-described communication system 100 is provided for illustration purposes only. The above-described communication system 100 may be implemented using any of a multitude of network configurations for use with the mobile communication devices 103. Suitable variations of the communication system 100 will be readily appreciated by a person of ordinary skill in the art and are intended to fall within the scope of the present disclosure.

Figure 2:
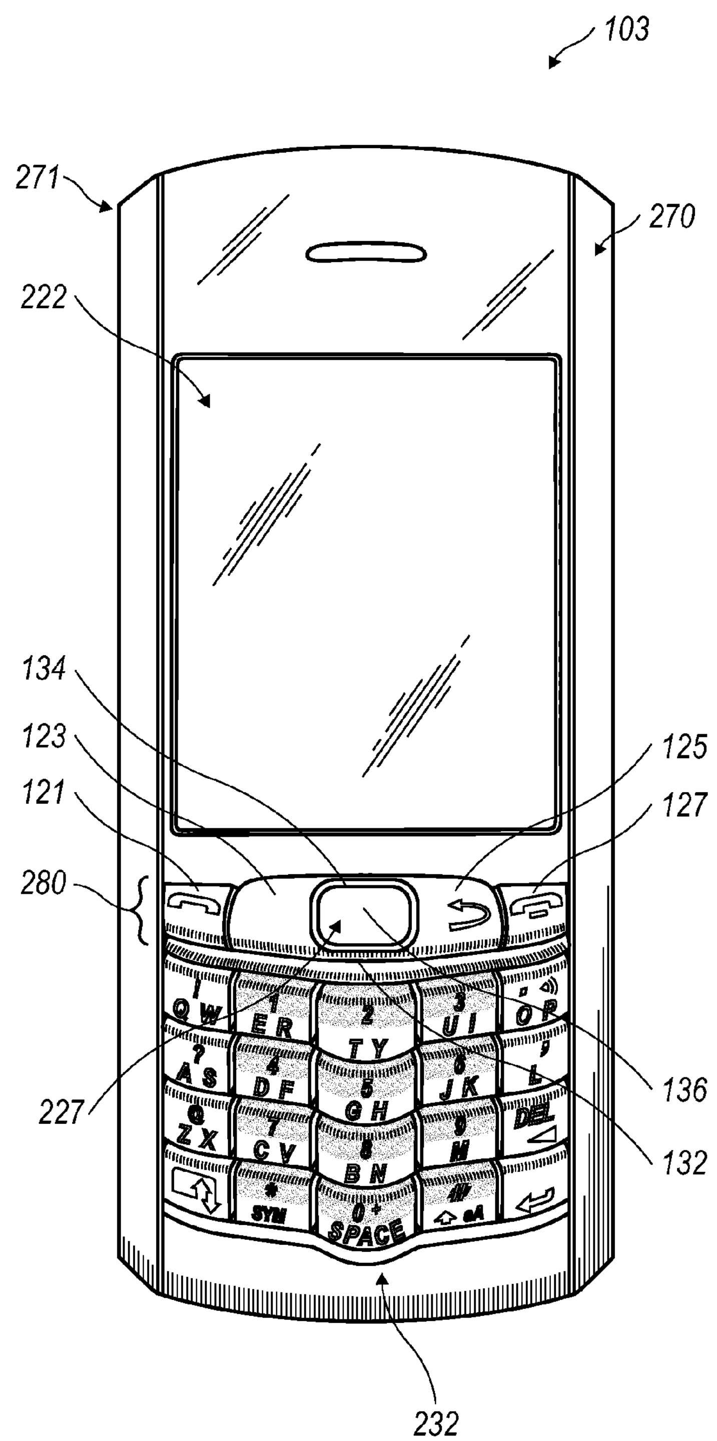
FIG. 2 is a mobile communication device according to one example.

FIG. 2 illustrates an example mobile communication device 200 having a display 222 which presents a user interface (not shown), positioned above a user input device, such as a keyboard 232 or other suitable device for accommodating textual input to the mobile communication device 200. In accordance with an aspect of the disclosure, the mobile communication device 200 may comprise a front face 270 having a navigation row 280. As shown, the mobile communication device 200 may include a "uni-body" structure, also known to those skilled in the art as a "candy-bar" design.

The mobile communication device 200 may include an optional auxiliary input device 227 that acts as a cursor navigation tool. The auxiliary input device 227 may be exteriorly located upon the front face 270 of the mobile communication device 200. The location of auxiliary input device 227 on the front face 270 allows the cursor navigation tool to be thumb-actuable, e.g., like the keys of the keyboard 232. Some examples provide the auxiliary input device 227 in the form of an optical navigation tool that may be utilized to instruct two-dimensional screen cursor movement in substantially any direction. The auxiliary input device 227 may act as an actuator when the cursor navigation tool is depressed like a button. Other examples may provide the auxiliary input device 227 in the form of a track pad, a touchpad, a trackball, a pointing stick, a joystick, or a graphics tablet, among other auxiliary input devices. The auxiliary input device 227 may be placed above the keyboard 232 and below the user interface 222. In this location, the auxiliary input device 227 may avoid interference during keyboarding and does not block the operator's view of the user interface or display screen 222 during use.

The mobile communication device 200 may be configured to send and receive multi-media content, including image files, music files, video images, voice note files, media files, text messages, email messages, text messages, telephone communication information, voice mail files, telephone call logs, address book entries, calendar entries, task list entries, word processing documents, mobile application content and browser content, among other multi-media content. According to one example, the mobile communication device 200 includes a body 271 that may be configured to be held in one hand during operation of the mobile communication device 200. The user interface is displayed on the front face 270 of the body 271 to provide information during device operation. The mobile communication device 200 also may be configured to send and receive voice communications, such as mobile telephone calls. The mobile communication device 200 may include a camera (not shown) to enable capture of digital content, such as photographs.

Figure 3:
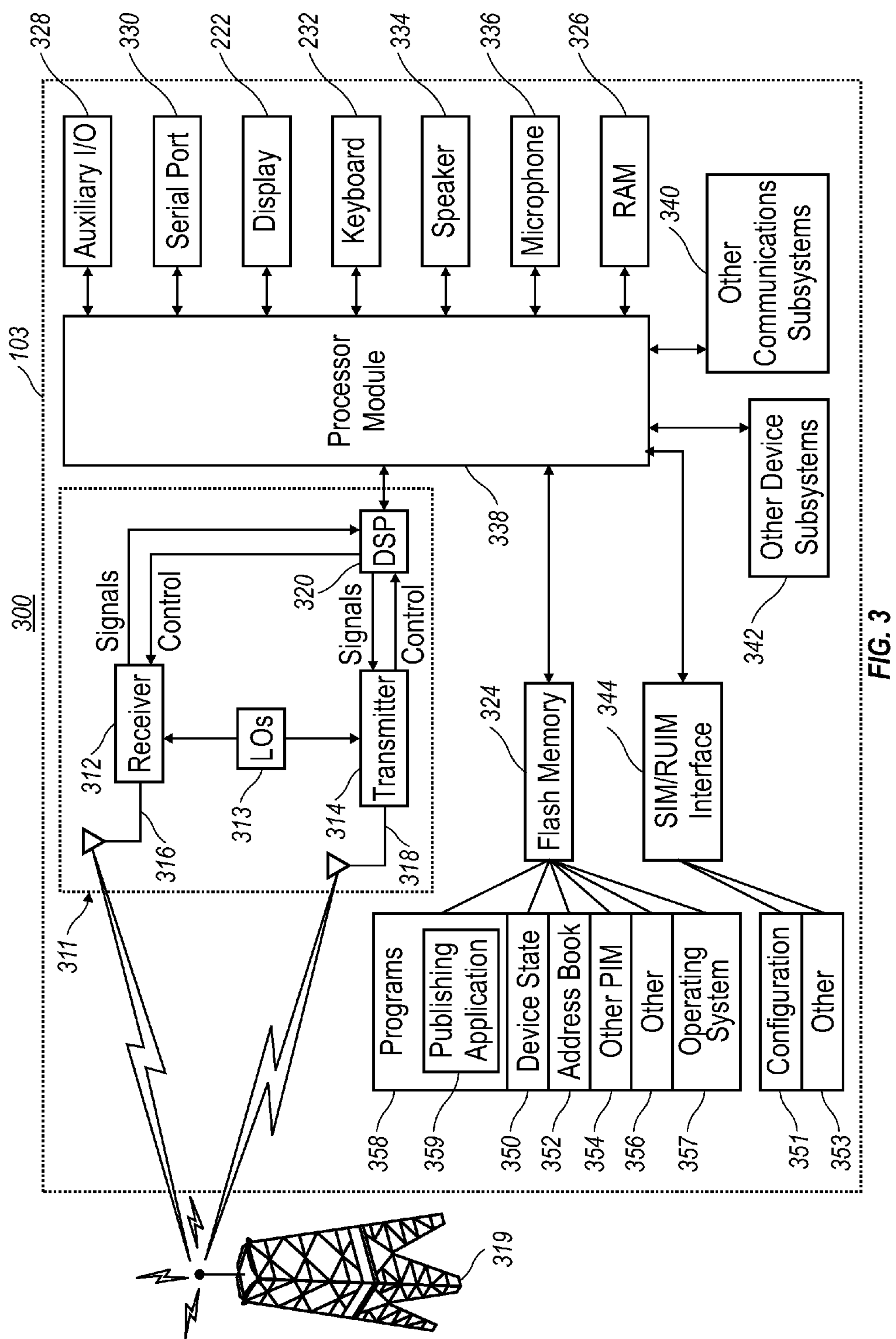
FIG. 3 is a block diagram of the mobile communication device illustrated in FIG. 2 operating in a communication environment according to one example.

FIG. 3 illustrates a block diagram 300 of the mobile communication device 103 in accordance with an example. The mobile communication device 103 includes a microprocessor 338 that controls operations of the mobile communication device 103. A communication subsystem 311 is provided that performs communications, including transmission and reception of data via the wireless network 319. The microprocessor 338 may be communicatively coupled to an auxiliary input/output (I/O) subsystem 328 of the mobile communication device 103. In at least one example, the microprocessor 338 may be communicatively coupled to a serial port 330, such as a Universal Serial Bus port, which enables communications with other devices or systems. The user interface or display 222 may be communicatively coupled to the microprocessor 338 for displaying information on the mobile communication device 103. When the mobile communication device 103 is equipped with a keyboard 232, the keyboard 232 also may be communicatively coupled with the microprocessor 338. The mobile communication device 103 may include a speaker 334, a microphone 336, a random access memory (RAM) 326, and a flash memory 324, among other components. These components may be communicatively coupled to the microprocessor 338. Other components may be provided on the mobile communication device 103 and these other components may be optionally communicatively coupled to the microprocessor 338. Other communication subsystems 340 and other communication device subsystems 342 are generally indicated as being functionally connected with the microprocessor 338 as well.

An example of a communication subsystem 340 includes a short range communication system, such as a BLUETOOTH® communication module or a WI-FI® communication module, such as a communication module in compliance with IEEE 802.11b, and associated circuits and components. Additionally, the microprocessor 338 may be configured to perform operating system functions and enable the execution of programs on the mobile communication device 103. In some examples, less than all of the above components may be included in the mobile communication device 103. For example, the keyboard 232 may not be provided as a separate component and but is instead integrated with a touch screen as described below.

The auxiliary I/O subsystem 328 may take the form of a variety of different navigation tools, including multi-directional or single-directional navigation tools. The navigation tools may include an optical navigation tool, a trackball navigation tool, a thumbwheel, a navigation pad, a joystick or a touch-sensitive interface, among other I/O interfaces. According to one example, the navigation tool may include the optical navigation tool illustrated in FIG. 2. These navigation tools may be located on the front surface of the mobile communication device 103 or may be located on any exterior surface of the mobile communication device 103.

Other auxiliary I/O subsystems may include external display devices and externally connected keyboards (not shown). While the above examples have been provided in relation to the auxiliary I/O subsystem 328, other subsystems capable of providing input or receiving output from the mobile communication device 103 are considered within the scope of this disclosure. Additionally, other keys may be placed along the side of the mobile communication device 103 to function as escape keys, volume control keys, scrolling keys, power switches, or user programmable keys, and may likewise be programmed accordingly.

The keyboard 232 may include a plurality of keys that are physical in nature, such as actuable buttons. Alternatively, the keyboard 232 may be implemented as a virtual keyboard. To this end, software instructions may be provided to represent physical keys (referred to herein as "virtual keys") on the display 222. It is also contemplated that user input may be provided as a combination of these two types of keys. Each key of the plurality of keys may be associated with at least one action, which may be the input of a character, a command or a function, among other actions. In this context, "characters" are contemplated to include, for example, alphabetic letters, language symbols, numbers, punctuation, insignias, icons, pictures, or blank space, among other characters.

In the case of virtual keys, the indicia for the respective keys may be shown on the user interface or display screen 222. According to one example, the virtual keys may be enabled by touching the display screen 222. A stylus, finger, or other pointer may be used to generate the character or activate the indicated command or function. Some examples of display screens 222 that are capable of detecting touch include resistive, capacitive, projected capacitive, infrared and surface acoustic wave (SAW) touch screens.

Physical and virtual keys may be combined in many different ways, as appreciated by those skilled in the art. In one example, the physical and virtual keys may be combined, such that the plurality of enabled keys for a particular program or feature of the mobile communication device 103 are shown on the display 222 in the same configuration as the physical keys. Using this configuration, the operator may select the appropriate physical key corresponding to what is shown on the display 222. Thus, the desired character, command or function is obtained by depressing the physical key corresponding to the character, command or function displayed at a corresponding position on the display 222, rather than touching the display 222.

Furthermore, the mobile communication device 103 may be equipped with components that enable operation of various programs. A flash memory 324 may be provided to store an operating system 357, device programs 358, and data. The device programs 358 may include a publication application 359, which is described further below. The operating system 357 is generally configured to manage the programs 358. The programs 358 may be stored in the flash memory 324 and may be executed on the microprocessor 338. The operating system 357 honors requests for services made by the programs 358 through predefined program interfaces, among other request types. More specifically, the operating system 357 typically determines the order in which the multiple programs 358 are executed on the microprocessor 338. The operating system 357 also determines an execution time allotted to each program 358, manages sharing of the flash memory 324 among the multiple programs, and handles input and output to and from other device subsystems 342, among performing other operations.

Additionally, operators may interact directly with the operating system 357 through the GUI. Interactions may be facilitated by input devices, including the keyboard 232 and the display screen 222. While an example of the operating system 357 may be stored in the flash memory 324, the operating system 357 in other examples may be stored in a read-only memory (ROM) or similar storage element (not shown). As those skilled in the art will appreciate, the operating system 357, device program 358 (or parts thereof) may be loaded in a RAM 326 or other volatile memory. The flash memory 324 may be configured to support communication between the publishing application 359 and a plurality of programs, including an address book 352, a personal information manager (PIM) 354, and a device state 350, among other programs. Additionally, the flash memory 324 may be configured to segregate communication between the programs 358 and other information 356.

When the mobile communication device 103 is enabled for two-way communication within the wireless communication network 319, signals may be sent and received from a mobile communication service. Examples of communication systems enabled for two-way communication include, but are not limited to, General Packet Radio Service (GPRS) networks; Universal Mobile Telecommunication Service (UMTS) networks; Enhanced Data for Global Evolution (EDGE) networks; Code Division Multiple Access (CDMA) networks; High-Speed Packet Access (HSPA) networks; Universal Mobile Telecommunication Service Time Division Duplexing (UMTS-TDD) networks; Ultra Mobile Broadband (UMB) networks; Worldwide Interoperability for Microwave Access (WiMAX) networks, or other networks that can be used for combined data and voice capabilities or separate data and voice capabilities.

For the communication systems listed above, the mobile communication device 103 may use a unique identifier to enable the mobile communication device 103 to transmit and receive signals from the communication network 319. Other systems may not use such identifying information. For example, GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different mobile communication devices 103. The mobile communication device 103 may be able to operate some features without a RUIM or SIM card, but may not be able to communicate with the network 319. A SIM/RUIM interface 344 may be located within the mobile communication device 103 to allow for removal or insertion of the RUIM and SIM card (not shown). The RUIM and SIM card may include a memory that holds key configurations 351 and other information 353, such as identification and subscriber-related information. With a properly enabled mobile communication device 103, two-way communication may be performed between the mobile communication device 103 and the communication network 319.

If the mobile communication device 103 is enabled as described above, or the communication network 319 includes such enablement, the two-way communication enabled mobile communication device 103 may be configured to both transmit and receive multi-media content and other data from the communication network 319. The communication transfer may be performed to or from the mobile communication device 103. In order to communicate with the communication network 319, the mobile communication device 103 may be equipped with an integral or internal antenna 318 that transmits signals to the communication network 319. Likewise, the mobile communication device 103 may be equipped with an additional antenna 316 for receiving communication from the communication network 319. According to one example, these antennae 316, 318 may be combined into a single antenna (not shown). As one skilled in the art would appreciate, the antenna or antennae 316, 318 may be externally mounted on the mobile communication device 103 in another example.

When equipped for two-way communication, the mobile communication device 103 may include the communication subsystem 311 that supports the operational needs of the mobile communication device 103. The communication subsystem 311 may include a transmitter 314 and a receiver 312 including an associated antenna or antennae 316, 318 as described above, local oscillators (LOs) 313, and a processing module that in the presently described example is a digital signal processor (DSP) 320.

It is contemplated that communication between the mobile communication device 103 and the wireless network 319 may be any type of communication that both the wireless network 319 and mobile communication device 103 are enabled to support. In general, these communications may be classified as voice and data communications. Voice communication generally refers to communication in which signals for audible sounds are transmitted through the communication network 319 by the mobile communication device 103. Data communication generally refers to all other types of communication that the mobile communication device 103 is capable of performing within the constraints of the wireless network 319.

FIGS. 1, 2 and 3 are examples only and those persons skilled in the art will appreciate that additional elements and modifications may be necessary to make the mobile communication device 103 operate in particular network environments. The illustrated examples disclose the mobile communication devices 103 as smart phones. Alternative examples contemplate that the communication devices 103 may include personal digital assistants (PDA), tablet computers, laptop computers, desktop computers, servers, or other communication devices capable of sending and receiving electronic messages. According to one example, the mobile communication devices 103 and the corresponding mobile communication device 300 structure may be characterized by an identification number that is assigned to the mobile communication device 103. According to one example, the identification numbers cannot be changed and are locked to each device.

The mobile communication devices 103 may include, or be modified to include, the publishing applications 359 to enable client-side monitoring of actions performed on the mobile communication devices 103. Alternatively, the publishing application 359 may reside on one or more servers 132, 134, 136 to enable server-side monitoring of actions performed on the mobile communication devices 103. The publishing application 359 may operate in a background mode to observe actions performed on the corresponding mobile communication devices 103. For example, the publishing application may run in the background to monitor and annotate actions performed using multi-media applications that operate in foreground. According to one example, the publishing application 359 may operate with user awareness and may be accessible to users on demand. Alternatively, the publishing application 359 may operate undetectable by users of the mobile communication devices 103.

The publishing application 359 may record additional data that is associated with the performed actions. The additional data may include user identifiers associated with the mobile communication device 103, GPS coordinates corresponding to the action location, an action time of occurrence, an action date of occurrence, an action day of occurrence, a total time duration of the action occurrence, a multi-media application type used to capture the action occurrence, a multi-media application version used to capture the action occurrence and weather conditions reported for the captured GPS coordinates, among additional data.

The publishing application 359 operates to capture and share multi-media information using the mobile communication devices 103. According to one example, the publishing application 359 may monitor and annotate actions performed using the mobile communication devices 103. For example, actions may be annotated by generating textual descriptions, visual representations or providing other annotation types that are supported by communication services subscribed to on the mobile communication devices 103. The selected annotations describing the actions performed on the mobile communication devices 103 may correspond with content types supported by selected communication services, including FLICKR® for digital image services, YOUTUBE™ for video image services, WORDPRESS™ for blogging services, TWITTER™ for micro-blogging services, and FACEBOOK™ for social networking services, among other communication services. The publishing application 359 may be configured to inventory communication services that are supported by the mobile communication device 103 and to store access information for the associated communication services. Furthermore, if the mobile communication device 103 is determined not to support or recognize the captured content, the publishing application 359 may direct users to online resources that enable the mobile communication device 103 to process the captured content. For example, the publishing application 359 may direct users to application resources, such as an application store, which allow users to download applications supporting the captured content.

According to one example, the publishing application 359 may capture and share multi-media information according to an action-based schedule. To this end, the user-performed actions and the device-performed actions may be annotated in real-time, concurrently with actions being performed on the mobile communication devices 103. Alternatively, the publishing application 359 may capture and share multi-media information on a time-based schedule. To this end, the user-performed actions and the device-performed actions may be annotated according to pre-determined frequencies, including, hourly, daily or weekly frequencies, among other frequencies. The time-based schedule may operate to restrict sharing of confidential information. For example, the publishing application 359 may be disabled during working hours to prevent capturing work-related information captured by the mobile communication device 103. Accordingly, the time-based schedule enables the publishing application 359 to be operated on a schedule. For example, the publishing application 359 may be activated after working hours during the work week, on weekend days, and during holidays to capture and share personal information Likewise, the publishing application 359 may be deactivated during working hours (e.g., Monday through Friday 9 am-5 pm) to prevent capture of work-related information.

Figure 4:
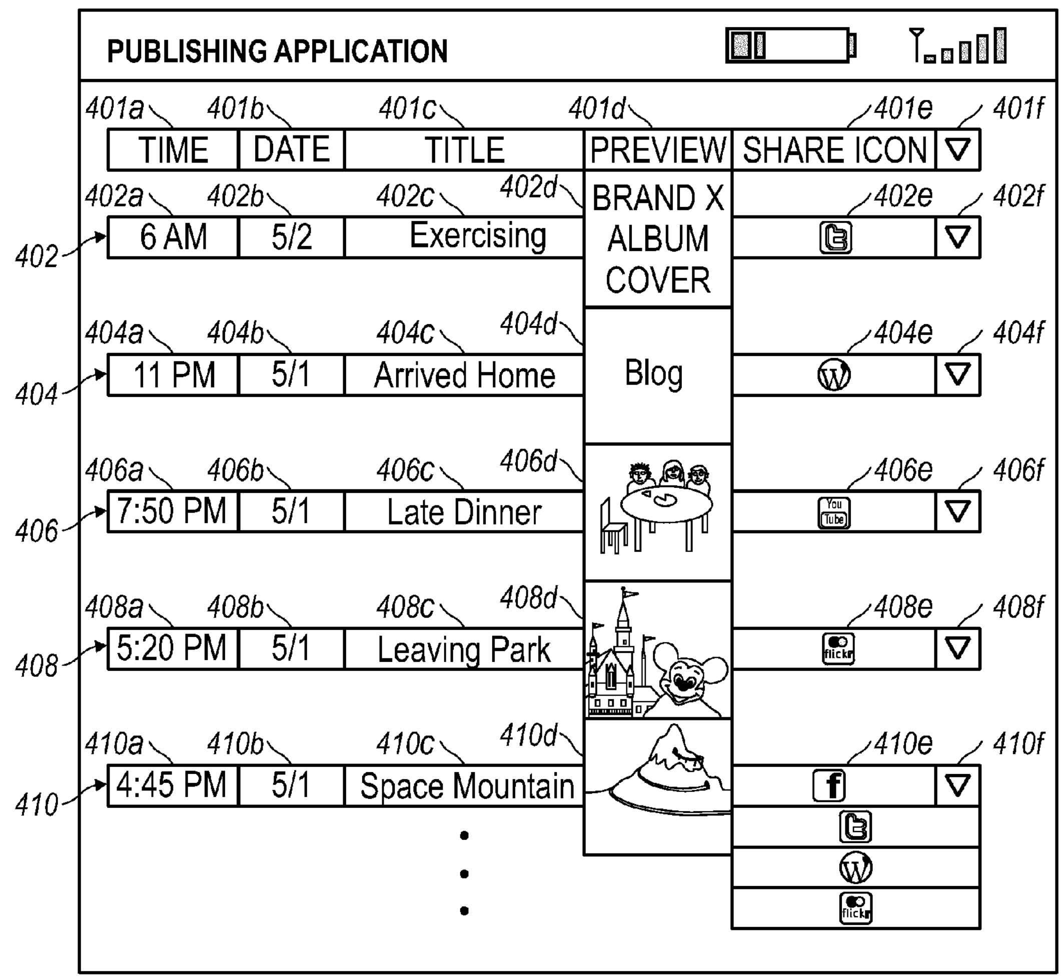
FIG. 4 is a visual representation of a data entry list according to one example.

FIG. 4 illustrates an example graphical user interface 400 that displays a graphical representation of actions performed using the mobile communication device 103. The graphical representation may include data structures 402-410 that correspond to individual actions performed using the mobile communication device 103. The data structures 402-410 may be organized in a list format, among other formats. A representative data structure 401 shows that the data structures 402-410 may be organized into plural fields, including a time of generation field 401*a*, a date of generation field 401*b*, a descriptive title field 401*c* and a content preview field 401*d*, among other fields. One or more communication service icons 401*e* may be positioned in association with the corresponding data structure to identify pre-selected communication services that support publishing content stored in the data structures. A drop down menu 401*f* may also be provided adjacent to the communication service icon to enable manual selection of a communication service for publishing content stored in the data structures. Alternatively, if there is no communication service accessible to the mobile communication device 103 that is determined to be compatible with the captured content, then the publishing application 359 may direct users to an application store for downloading a compatible communication service. One of ordinary skill in the art will readily appreciate that the mobile communication device application user interface may be configured differently.

The data structures 402-410 may be associated with tags or meta-data that describe the captured content. Tags or metadata generally refer to non-hierarchical keywords or terms that are associated with the captured content, such as digital images, web pages or computer files, among other captured content. The tags or metadata are associated with the captured content to enable the publishing application 359, a web browser or other search tool to locate the captured content using keyword searching, among providing other benefits. The tags or metadata may be assigned to the captured content informally and personally by the digital item's creator.

The data structures 402-410 may be arranged in chronological order by date and time, among other orders. For example, the chronological list of actions may be arranged in reverse chronological order so that actions performed more recent in time may be provided at an upper position on the list, while actions performed less recent in time may be provided at a lower position on the list. One of ordinary skill in the art will readily appreciate that the graphical representations may be presented through other configurations.

The recorded actions may be organized into a list of data structures 402-410 and each data structure may be associated with a share icon category 420. The share icon may be selected to upload content to a desired communication service. The share icon category 420 may be positioned physically adjacent to a corresponding data structure and may include a corresponding logo that visually identifies a communication service that is selected for sharing the content associated with a selected data structure. For example, the share icon associated with corresponding data structures 402-410 may display a TWITTER™ logo or a FACEBOOK™ logo, among other logos. Users may depress a selected share icon to publish content through the communication service associated with the corresponding data structure 402-410. Users may select a drop down menu icon 401*f* to display alternative communication services for publishing the selected content. Users may select and depress a desired share icon from the menu of alternative communication services to publish content through the selected communication service.

Returning to the above example where the mobile communication device user accesses a music player on the mobile communication device 103, the user may select to listen to The X Album by Y artist. In response to the selection, the publishing application 359 may automatically compose at least one textual message describing the user-performed actions and the device-performed actions. For example, the publishing application 359 may compose textual messages concurrent in time with a user's manipulation of the mobile communication device 103.

For example, the user may manipulate the mobile communication device 103 to select music content that is played while the user is performing another activity. While the mobile communication device 103 is being manipulated, the publishing application 359 may observe the performed actions and may generate a textual message stating: "It's 6 am—exercising in Boca; sun rise is beautiful; selected brand-Z music player on my BLACKBERRY®; listening to The X Album by Y artist." During message generation, the publishing application 359 may extract time data and location data from the clock, cell tower location data and the GPS sensor of the mobile communication device 103 to populate the time field 402*a* and the date field 402*b* of the data structure 402. The data extraction may be initiated in response to manipulation of the interface devices, including the navigation tool, the keyboard and the GUI. The activity data (e.g., exercising) may be extracted from a calendar entry that corresponds to a time when the textual message was composed. The activity data description may appear in the title field 402*c* of the data structure 402. The user may insert the environmental data (e.g., sun rising) between a time that the textual message is composed and sent. Alternatively, the environmental data may be extracted from a local data source, such as a website, based on the extracted time data, the extracted date data or the extracted activity data, among other data types. The activity data may be stored in the memory 324 and may be associated with the data structure 402. Users may navigate over a field to enable modification of the field. For example, the user may navigate over the title field 402*c* to modify the automatically generated title. Users also may edit the activity data prior to sharing or publishing the corresponding data structure 402 over the network. The user-performed action data, including (1) selecting the brand-Z music player and (2) listening to the particular album and artist may be extracted by the publishing application 359, which is programmed to monitor actions performed on the mobile communication device 103.

According to another example, the mobile communication device user may access a camera application on the mobile communication device 103 to capture digital images. In this case, the publishing application 359 may automatically embed data or associate data with the captured digital images. The embedded data may include GPS data, GIS data, time of capture data, weather data, content description data and application-type data, among other data. The publishing application 359 also may compose at least one textual message describing the user-performed actions and the device-performed actions. To this end, the publishing application 359 may compose textual messages concurrently in time with a user's manipulation of the mobile communication device 103.

According to one example, users may manipulate the mobile communication device 103 to capture digital images during a visit to an amusement park. The publishing application 359 may receive the digital images from the camera application and may compose a textual message describing the digital images and activity performed on the mobile communication device 103. For example, the publishing application 359 may compose a message stating: "I'm on SPACE MOUNTAIN® in WALT DISNEY WORLD®! The kids love it—see all the smiles." While the message is being generated, the publishing application 359 may extract time data and location data from the clock and the GPS sensor of the mobile communication device 103 to populate the time field 410*a* and the date field 410*b* of the data structure 410. The data extraction may be performed in response to an initial manipulation of the interface devices, including the navigation tool, the keyboard and the GUI. The activity data (e.g., SPACE MOUNTAIN®) may be extracted from GPS coordinates that corresponds to a time when the textual message was composed. The activity data description may appear in the title field 410*c* of the data structure 410. The user may insert the personal information (e.g., The kids love it—see all the smiles.) between a time that the textual message is composed and sent. Alternatively, the personal data may be extracted from the memory 324, which may have pre-stored messages therein. The activity data may be stored in the memory 324 and may be associated with the corresponding data structure 410 (not shown). Users may navigate over a field to enable modification of the field. For example, the user may navigate over the title field 410*c* to modify the automatically generated title. The user also may edit the activity data prior to sharing the corresponding data structure 410. The user-performed action data, including (1) selecting the camera application and (2) capturing digital images may be extracted by the publishing application 359, which is programmed to monitor actions performed on the mobile communication device 103.

The publishing application 359 may provide the preview field in addition to the title field. The preview field enables a non-textual visual representation of the associated data entries 402-410. In other words, the preview field 410*d* may display a digital image or photograph of the family posing at SPACE MOUNTAIN®. By viewing content presented in both the title field 410*c* and the preview field 410*d*, the user may be provided with an improved understanding of the captured content. The user also may edit content that is displayed in the title field 410*c* and the preview field 410*d* based on personal preferences. For example, the user may switch or remove the digital image that is displayed in the preview field 410*d*, among performing other actions.

If the user decides to share information associated with the one of the data entries 402-410, the user may select the appropriate share icon 402*e*-410*e*. The share icon 410*e* may be presented on the GUI with an image of the pre-selected communication service, such as the FACEBOOK™ logo. Alternatively, the user may manipulate the interface device to scroll among other data entries that are not shown on the GUI. Upon selecting the desired share icon 410*e*, status indicators may be provided that display the process state for the corresponding data structure 402-410. For example, the status indicators may notify users that the selected content is being uploaded, that the upload is complete, that no network is available to upload and that an error occurred during uploading, among providing other status indicators.

After successfully completing the upload process, the data entries 402-410 on the mobile communication device 103 may be assigned a unique identifier that links the data entries 402-410 to corresponding online data entries. The unique identifier may be specific to a communication service and facilitates locating shared content within the communication service. In this way, users may be able to locate any online data entries through the respective online communication services. The publishing application 359 tracks the multimedia information and enables users to access and modify the online data entries, as desired, through the respective online communication services.

The drop down menu icon 410*f* may be provided to enable users to change the pre-selected communication service. For example, upon selecting the drop down menu icon 410*f*, the user may select a desired communication service from a plurality of communication services. In this way, the user may change the pre-selected communication service for sharing the digital images to FLICKR® from FACEBOOK™, for example. Thus, the user may efficiently capture and share multi-media information with minimal manipulation of the mobile communication device 103.

Additionally, the publishing application 359 may be configured to comply with guidelines or rules set by the various communication services. For example, the publishing application 359 may limit the length of the generated textual message to less than 140 characters to comply with the TWITTER™ micro-blogging service guidelines. To accomplish this limitation, the publishing application 359 may split the textual message into multiple tweets that are each less than 140 characters. Alternatively, the publishing application 359 may alert the user to edit the message below the 140 character limit before sending the message. Still further, the publishing application 359 may alert users if the captured content does not comply with other preferred guidelines, such as a low resolution for digital images, among other deficiencies.

The publishing application 359 enables users to automatically capture and efficiently share the captured content associated with the user-performed actions and the device-performed actions occurring on the mobile communication device 103. The captured content may be presented on the GUI 222 and is editable prior to publishing the content via the online communication service, such as a blogging service, a micro-blogging service, or a networking service, among other communication services. The publishing application 359 may manage the user-performed actions and the device-performed actions based on action-based or time-based schedules. The captured content may be configured for display on the mobile communication device user interface 222. The number of data entries selected for display may correspond to the resources available on the mobile communication device 103, among other criteria.

Figure 5:
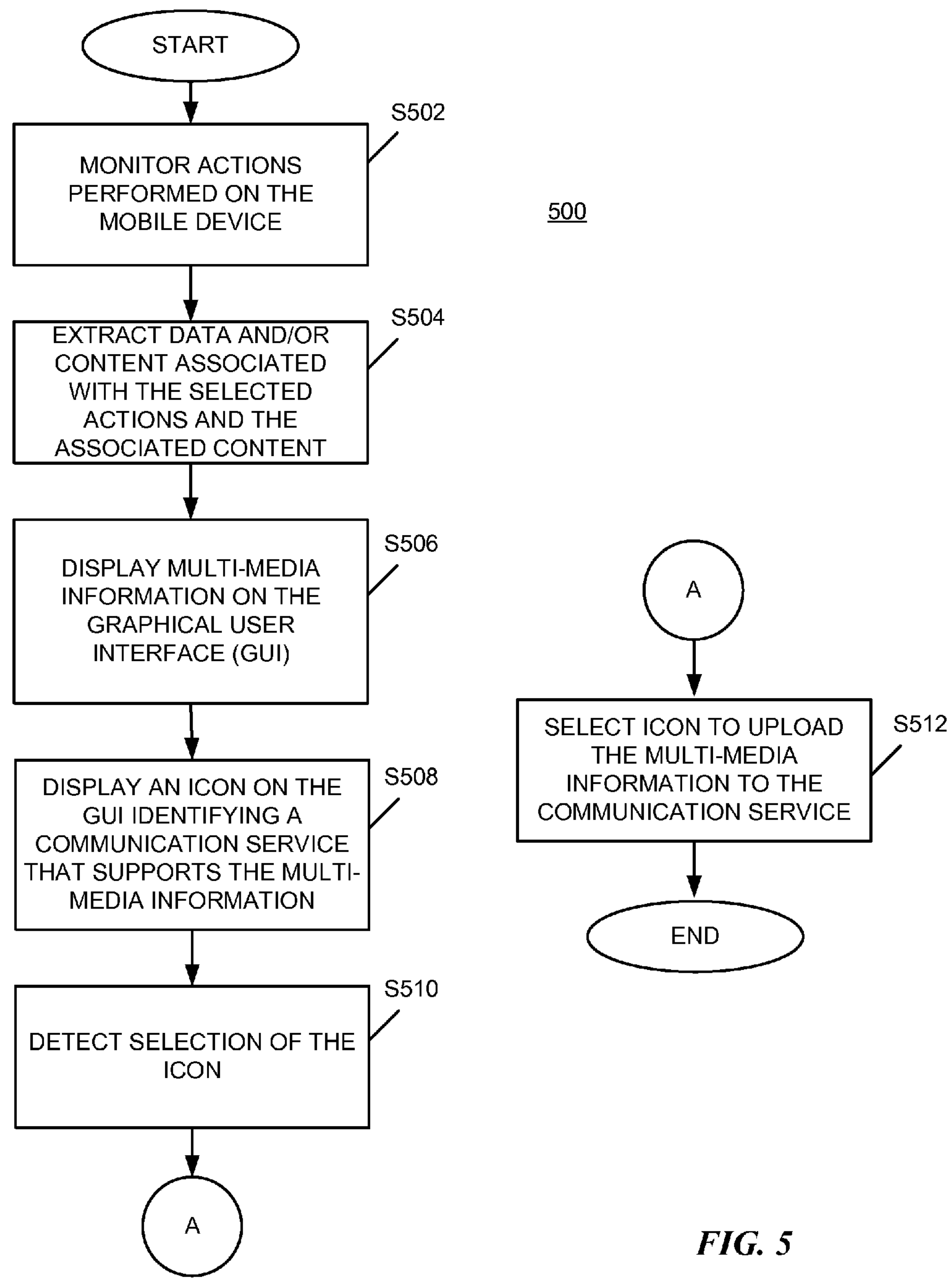
FIG. 5 is a flow chart illustrating a process for generating and publishing multi-media information associated with actions performed on a mobile communication device according to one example.

FIG. 5 illustrates a process diagram for performing a method 500 of generating and publishing multi-media information associated with actions performed on a mobile communication device according to one example. The publishing application 359 monitors actions performed on the mobile communication device in step S502 and enables selection of at least one of the actions. The publishing application 359 may store content associated with the selected actions to the memory 324 and, in step S504, the publishing application 359 extracts data associated with at least one of the at least one selected actions and the content associated with the at least one selected actions. In step 506, the publishing application 359 displays multi-media information on a graphical user interface of the display 222. The multi-media information may include at least one of the at least one selected actions, the content associated with the at least one selected actions and the extracted data. In step S508, the publishing application 359 displays an icon on the graphical user interface of the mobile communication device, the icon identifying a communication service that supports the multi-media information. In step S510, the publishing application 359 detects selection of the icon. The icon may be positioned proximate or adjacent to the corresponding data structure. In step S512, the publishing application 359 enables the user to publish or upload the multi-media information to the communication service by selecting the icon.

The method 500 may further include displaying a menu icon that provides a plurality of alternate communication services that support the multi-media information stored in the data structure. The menu icon may be positioned adjacent to the icon. Upon selecting one of the alternate communication services from the menu icon, the image on the icon may be updated to correspond to the selected alternate communication service. Upon selecting the modified icon, the multi-media information may be published or uploaded to the selected alternate communication service.

According to one example, the publishing application 359 may be a client application that resides on the mobile communication device 103 and is executable on the microprocessor 338. The publishing application 359 may request information corresponding to the user-performed action and the device-performed actions. Accordingly, the client device 103 may process the received data. Alternatively, the disclosure may include a client application that communicates with a remote server application to enable processing the data at the remote server.

The disclosure may be implemented using hardware or software in association with hardware. In some embodiments, the software may include firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the disclosure may take the form of a computer program product that includes program modules accessible from computer-usable or computer-readable medium storing program code for use by or in connection with one or more computers, processors, or instruction execution system. The medium can be an electronic, magnetic, optical, electromagnetic, infrared, or semiconductor system (or apparatus or device) or a propagation medium (though propagation mediums in and of themselves as signal carriers are not included in the definition of physical non-transitory computer-readable medium). Examples of a physical non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

What is claimed is:

1. A non-transitory computer-implemented method of generating and publishing multi-media information, the method comprising:

detecting actions performed on the communication device;

identifying an application associated with at least one of the detected actions;

obtaining data from the identified application and another application;

rendering multi-media information on a graphical user interface of the communication device, the multi-media information being based on the data obtained from the identified application and the another application, the multi-media information including a textual description of an event associated with the one or more detected actions and content obtained from the identified application;

displaying an icon on the graphical user interface of the communication device, the icon identifying a communication service; and uploading the multi-media information to the communication service upon detecting selection of the icon.

2. The non-transitory computer-implemented method of claim 1, wherein detecting the actions includes detecting user-performed actions and device-performed actions.

3. The non-transitory computer-implemented method of claim 2, wherein the user-performed actions include actions performed directly or indirectly by a user manipulating the communication device.

4. The non-transitory computer-implemented method of claim 2, wherein the device-performed actions include actions performed directly or indirectly by a processor that controls the communication device.

5. The non-transitory computer-implemented method of claim 1, wherein the multi-media information is stored in a data structure comprising a plurality of fields including at least two of a time of generation field, a date of generation field, a descriptive title field, and a content preview field.

6. The non-transitory computer-implemented method of claim 1, wherein obtaining the data includes obtaining at least one of global positioning satellite data, geographic information system data, time of capture data, weather data, content description data, and application-type data.

7. The non-transitory computer-implemented method of claim 1, further comprising:

displaying a plurality of icons on a menu icon, each icon identifying an alternate communication service that supports the multi-media information; and uploading the multi-media information to the alternate communication service upon detecting selection of one of the plurality of icons from the menu icon.

8. A non-transitory computer readable medium for generating and publishing multi-media information, the computer readable medium comprising instructions which, upon execution by a processor of the communication device, cause the communication device to:

detect actions performed on the communication device;

identify an application associated with at least one of the detected actions;

obtain data from the identified application and another application;

render multi-media information on a graphical user interface of the communication device, the multi-media information being based on the data obtained from the identified application and the another application, the multi-media information including a textual description of an event associated with the one or more detected actions and content obtained from the identified application;

display an icon on the graphical user interface of the communication device, the icon identifying a communication service; and upload the multi-media information to the communication service upon detecting selection of the icon.

9. The non-transitory computer readable medium of claim 8, further comprising instructions which, upon execution by the processor cause the communication device to detect the actions including detecting user-performed actions and device-performed actions.

10. The non-transitory computer readable medium of claim 9, wherein the user-performed actions include actions performed directly or indirectly by a user manipulating the communication device.

11. The non-transitory computer readable medium of claim 9, wherein the device-performed actions include actions performed directly or indirectly by the processor that controls the communication device.

12. The non-transitory computer readable medium of claim 8, wherein the multi-media information is stored in a data structure comprising a plurality of fields including at least two of a time of generation field, a date of generation field, a descriptive title field and a content preview field.

13. The non-transitory computer readable medium of claim 8, wherein the communication device obtains the data, including at least one of global positioning satellite data, geographic information system data, time of capture data, weather data, content description data, and application-type data.

14. The non-transitory computer readable medium of claim 8, further comprising instructions which, upon execution by the processor, cause the communication device to:

display a plurality of icons on a menu icon, each icon identifying an alternate communication service that support the multi-media information; and upload the multi-media information to the alternate communication service upon detecting selection of one of the plurality of icons from the menu icon.

15. A communication device for generating and publishing multi-media information, the communication device comprising:

a display;

a non-transitory memory having a plurality of applications stored thereon; and a processor in communication with the display and the memory, the processor being programmed to:

detect actions performed on the communication device;

identify an application associated with at least one of the detected actions;

obtain data from the identified application and another application;

render multi-media information on the display, the multi-media information being based on the data obtained from the identified application and the another application, the multi-media information including a textual description of an event associated with the one or more detected actions and content obtained from the identified application;

display an icon on the display, the icon identifying a communication service; and upload the multi-media information to the communication service upon detecting selection of the icon.

16. The communication device of claim 15, wherein the processor is further programmed to detect the actions including detecting user-performed actions and device-performed actions.

17. The communication device of claim 16, wherein the user-performed actions include actions performed directly or indirectly by a user manipulating the communication device and wherein the device-performed actions include actions performed directly or indirectly by the processor that controls the communication device.

18. The communication device of claim 15, wherein the memory stores the multi-media information in a data structure comprising a plurality of fields including at least two of a time of generation field, a date of generation field, a descriptive title field, and a content preview field.

19. The communication device of claim 15, wherein the processor is programmed to obtain the data from the applications, including global positioning satellite data, geographic information system data, time of capture data, weather data, content description data, and application-type data.

20. The communication device of claim 15, wherein the processor is further programmed to:

display a plurality of icons on a menu icon, each icon identifying an alternate communication service that supports the multi-media information; and upload the multi-media information to the alternate communication service upon detecting selection of one of the plurality of icons from the menu icon.

* * * * *